United States Patent
McKinstrie

(10) Patent No.: US 8,797,639 B2
(45) Date of Patent: Aug. 5, 2014

(54) METHOD AND SYSTEM FOR REGENERATING AND RESHAPING OF OPTICAL SIGNALS

(75) Inventor: Colin McKinstrie, Manalapan, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 406 days.

(21) Appl. No.: 13/330,418

(22) Filed: Dec. 19, 2011

(65) Prior Publication Data
US 2013/0155491 A1 Jun. 20, 2013

(51) Int. Cl.
G02F 1/35 (2006.01)

(52) U.S. Cl.
USPC .............. 359/330; 359/326; 359/333; 372/21

(58) Field of Classification Search
None
See application file for complete search history.

(56) References Cited

U.S. PATENT DOCUMENTS

| | | | |
|---|---|---|---|
| 5,771,117 A * | 6/1998 | Harris et al. | 359/326 |
| 7,304,788 B2 | 12/2007 | McKinstrie | |
| 7,436,580 B2 | 10/2008 | McKinstrie | |
| 2007/0160093 A1* | 7/2007 | Nishizawa et al. | 372/21 |
| 2011/0273763 A1* | 11/2011 | Kaertner et al. | 359/330 |

OTHER PUBLICATIONS

Hansryd, P.A., et al., "Fiber-based optical parametric amplifiers and their applications," IEEE J. Sel. Top. Quantum Electron. 8, 506-520 (2002).
Radic, S., et al., "Optical amplification and signal processing in highly nonlinear optical fiber," IEICE Trans. Electron. E88-C, 859-869 (2005).
Inoue, K., "Tunable and selective wavelength conversion using fiber four-wave mixing with two pump lights," IEEE Photon. Technol. Lett. 6, 1451-1453 (1994).
Tanemura, T., et al., "Highly efficient arbitrary wavelength conversion within entire C-band based on nondegenerate fiber four-wave mixing," IEEE Photon. Technol. Lett. 16, 551-553 (2004).
McKinstrie, C. J., et al., "Translation of quantum states by four-wave mixing in fibers," Opt. Express 13, 9131-9142 (2005).
Gnauck, A. H., et al., "Demonstration of low-noise frequency conversion by Bragg scattering in a fiber," Opt. Express 14, 8989-8994 (2006).
Raymer, M. G., et al., "Interference of two photons of different color," Opt. Commun. 283, 747-752 (2010).
McGuinness, H. J., et al., Quantum frequency translation of single-photon states in a photonic crystal fiber, Phys. Rev. Lett. 105, 093604 (2010).
Uesaka, K., et al., "Wavelength exchange in a highly nonlinear dispersion-shifted fiber: Theory and experiments," IEEE J. Sel.Top. Quantum Electron. 8, 560-568 (2002).

(Continued)

Primary Examiner — Hemang Sanghavi
(74) Attorney, Agent, or Firm — Hitt Gaines, PC

(57) ABSTRACT

A method and an apparatus for processing an optical signal are disclosed wherein an input optical signal having an amplitude profile is combined by means of Bragg scattering with a first pulsed pump signal having a first waveshape and a second pulsed pump signal having a second waveshape. The combined optical signal is input in a nonlinear optical material for frequency converting the input optical signal thereby obtaining an idler signal wherein the first pulsed pump signal co-propagates with the input optical signal and the second pulsed pump signal co-propagates with the idler signal. The idler signal produced has a peak amplitude proportional to the peak amplitude of the input optical signal and a shape corresponding to the second pump waveshape.

8 Claims, 6 Drawing Sheets

(56) References Cited

OTHER PUBLICATIONS

M'Echin, D., et al., "180-nm wavelength conversion based on Bragg scattering in an optical fiber," Opt. Express 14, 8995-8999 (2006).

Provo, R., et al., "Bragg scattering in a positive 4 fiber," Opt. Lett. 35, 3730-3732 (2010).

McGuinness, H. J., et al., Wavelength translation across 210 nm in the visible using vector Bragg scattering in a birefringent photonic crystal fiber, IEEE Photon. Technol. Lett. 23, 109-111 (2011).

Inoue, K., "Polarization effect on four-wave mixing efficiency in a single-mode fiber," J. Quantum Electron. 28, 883-894 (1992).

McKinstrie, C. J., et al., "Four-wave mixing in fibers with random birefringence," Opt. Express 12, 2033-2055 (2004).

Marhic, M. E., et al., Fiber optical parametric amplifiers with linearly or circularly polarized waves, J. Opt. Soc. Am. B 20, 2425-2433 (2003).

Weiner, A. M., "Femtosecond Pulse Shaping Using Spatial Light Modulators," Review of Scientific Instruments, May 2000, pp. 1929-1960, vol. 71, No. 5.

Weiner, A. M., "Ultrafast Optical Pulse Shaping: A Tutorial Review," Optics Communications Journal, 2011, pp. 3669-3692.

McKinstrie, C. J., et al., "Parametric Amplifiers Driven by Two Pump Waves," IEEE Journal, May/Jun. 2002, pp. 538-547, vol. 8, No. 3.

McKinstrie, C. J., et al., "Correction to " 'Parametric Amplifiers Driven by Two Pump Waves' IEEE Journal, Jul./Aug. 2002, pp. 956, vol. 8, No. 4.

Cundiff, Steven T., et al., "Optical Arbitrary Waveform Generation," Nature Photonics, Nov. 2010, pp. 760-766, vol. 4.

McKinstrie, C. J., et al., "Four-Wave Mixing in a Rapidly-Spun Fiber," Optics Express, Sep. 2006, pp. 8516-8534, vol. 14, No. 19.

\* cited by examiner

METHOD AND SYSTEM FOR REGENERATING AND RESHAPING OF OPTICAL SIGNALS

TECHNICAL FIELD OF THE INVENTION

The present invention is directed, in general, to optical signals.

BACKGROUND ART

Parametric signal processing in a fiber is typically based on four-wave mixing (FWM). Devices based on such techniques can typically amplify, frequency convert (FC), phase conjugate, regenerate and sample optical signals in communication systems. One particular implementation of such frequency conversion is the so-called Bragg scattering (BS) which is also a technique known in the related art.

SUMMARY

BS, as known in the related art is a frequency conversion process based on nondegenerate FWM in which a sideband (signal) photon and a pump photon are destroyed and different sideband (idler) and pump photons are created. FIGS. 1a and 1b illustrate frequency diagrams of this process in which a sideband (signal) photon and a pump photon are destroyed, and different sideband (idler) and pump photons are created ($\pi_p + \pi_s \rightarrow \pi_q + \pi_r$, where $\pi_j$ represents a photon with frequency $\omega_j$). FIG. 1a corresponds to a nearby Bragg scattering and FIG. 1b corresponds to distant Bragg scattering. Therefore, BS can frequency shift waves with similar (nearby) frequencies, or waves with dissimilar (distant) frequencies. In these figures, long arrows denote pumps (p and q), whereas short arrows denote idler and signal sidebands (r and s). Downward arrows denote modes that lose photons, whereas upward arrows denote modes that gain photons. The directions of the arrows are reversible.

BS is a versatile process capable of providing tunable and low-noise FC for classical optical signals or single photons. In the context of the present invention, a classical signal is to be understood to refer to a signal which contains many photons and is in general governed by the laws of classical physics. An example of such classical signals is signals in conventional (i.e. deployed) communication systems. Single photons, in contrast, are governed by the laws of quantum mechanics.

Not only does BS allow for transfer of power (photon flux) from the input signal to the output idler, it also transfers the quantum state. For example, if the input photon is entangled with another quantum degree of freedom, so also will be the output photon.

Embodiments of the present disclosure are related to BS signal processing with the aim of providing efficient regeneration and reshaping of an optical signal which may improve the quality of transmission and detection of the optical signal and facilitate the use of pulse-shape coding. In systems employing pulse-shape coding, each orthogonal pulse shape may represent a different symbol. BS allows for adding and dropping information from specific channels, and exchanging information between channels, in such systems.

Some embodiments of the disclosure relate to a method of processing an optical signal comprising:
  combining, by means of Bragg scattering, an input optical signal having a peak amplitude and a carrier frequency with a first pulsed pump signal having a first waveshape and a second pulsed pump signal having a second waveshape, thereby generating a combined optical signal;
  inputting the combined optical signal in a nonlinear optical material for causing said input optical signal, said first pulsed pump signal and said second pulsed pump signal to interact with each other so as to generate an idler signal, said idler signal having a carrier frequency which is different from the carrier frequency of the input optical signal; wherein the first pulsed pump signal co-propagates with the input optical signal and the second pulsed pump signal co-propagates with the idler signal, and wherein the idler signal has a peak amplitude proportional to the peak amplitude of the input optical signal and a shape corresponding to the second pump waveshape.

According to some specific embodiments, the first pump waveshape is chosen so as to maximize interaction of said pulsed pump signal with the input optical signal thereby producing a shape for an output idler signal, corresponding to the second pump waveshape.

According to some specific embodiments, the method further comprises an FWM process thereby producing a frequency-shifted idler being a conjugated copy of the input optical signals thereby converting a frequency of the idler to a frequency of the input optical signal.

According to some specific embodiments frequency conversion is applied to the input optical signal prior to inputting the combined optical signal into a nonlinear optical material.

According to some specific embodiments, the method of frequency conversion and reshaping is applied to pulses containing arbitrary numbers of photons.

Some embodiments of the disclosure relate to an apparatus for processing an optical signal comprising:
  a coupler, a first pump and a second pump wherein the coupler is configured for combining, an input optical signal having a peak amplitude and a carrier frequency with a first pulsed pump signal generated by the first pump and having a first waveshape and a second pulsed pump signal generated by the second pump and having a second waveshape, thereby generating a combined optical signal;
  a nonlinear optical material capable of receiving the combined optical signal and causing said input optical signal, said first pulsed pump signal and said second pulsed pump signal to interact with each other by means of Bragg scattering so as to generate an idler signal, said idler signal having a carrier frequency which is different from the carrier frequency of the input optical signal;
  wherein, in use, the first pulsed pump signal co-propagates with the input optical signal and the second pulsed pump signal co-propagates with the idler signal, the idler signal having a peak amplitude proportional to the peak amplitude of the input optical signal and a shape corresponding to the second pump waveshape.

According to some specific embodiments, the coupler comprises a first coupler for combining the first pulsed pump signal with the second pulsed pump signal thereby generating a combined pulsed pump signal and a second coupler for combining the combined pulsed pump signal with the input optical signal.

According to some specific embodiments, the coupler is a three-way coupler adapted for combining the first pulsed pump signal, the second pulsed pump signal and the input optical signal.

BRIEF DESCRIPTION OF THE DRAWINGS

For a more complete understanding of the present disclosure, reference is now made to the following description taken in conjunction with the accompanying drawings, in which.

DETAILED DESCRIPTION

Embodiments of the present disclosure relate to the use of BS in order to regenerate and reshape optical signals.

Herein, the terms "regenerate" or "regeneration" are to be understood to relate to techniques of reducing noise on an optical signal. Likewise, the terms "reshape" or "reshaping" are to be understood to relate to techniques of changing the shape or format of an optical signal.

In BS, the conservation of energy and momentum are typically manifested by the frequency-matching and wavenumber-matching conditions. BS is driven by pump-induced nonlinear coupling and suppressed by dispersion-induced wavenumber mismatch. Therefore, it may be desirable to determine the conditions under which BS is wavenumber matched.

Some solutions for obtaining wavenumber match are discussed in articles by C. J. McKinstrie, J. D. Harvey, S. Radic and M. G. Raymer, "Translation of quantum states by four-wave mixing in fibers," Optics Express 13, 9131 (2005) and H. J. McGuinness, M. G. Raymer, C. J. McKinstrie and S. Radic, "Quantum frequency translation of single-photon states in a photonic crystal fiber," Physical Review Letters 105, 093604 (2010)> The content of both of these articles is incorporated herein by reference in its entirety.

BS may be configured to generate waves whose frequencies may be substantially symmetric about a zero-dispersion frequency. When two pumps are used for optical wave generation, one pump may co-propagate with the input optical signal, whereas the other pump co-propagates with the idler thereby enabling reshaping functions as will be described in further detail below.

Figure 2:
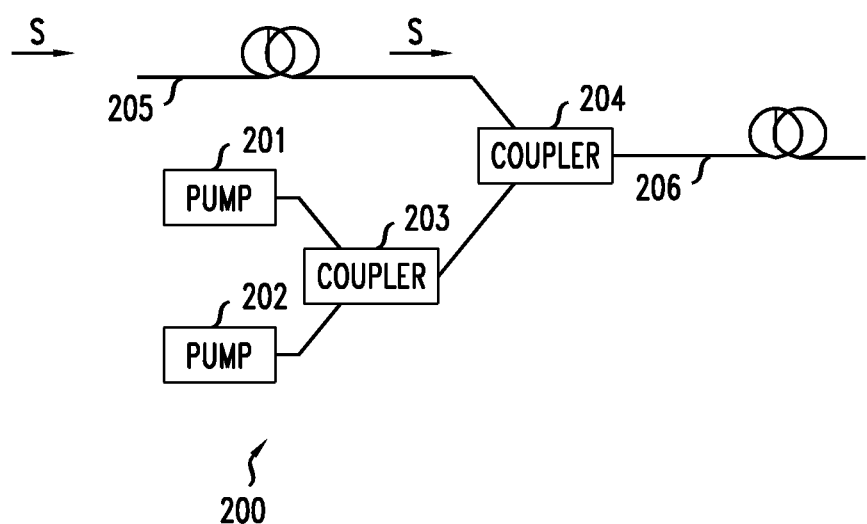
FIG. 2 is an exemplary schematic representation of an apparatus for optical parametric processing according to some embodiments.

FIG. 2 is an exemplary schematic representation of an apparatus for use in optical parametric processing according to some embodiments. The optical parametric processing apparatus (herein also referred to as OPPA) 200 may be configured for use in a long-haul transmission line of an optical communication system. For example OPPA 200 may be coupled between two sections of a longhaul optical fiber.

OPPA 200 has a first pump-wave source 201 and a second pump-wave source 202. Herein each one of the pump-wave sources may also be referred to as pump source or simply pump. The pumps 201 and 202 may be of any known type such as for example a laser source.

Figure 1A:
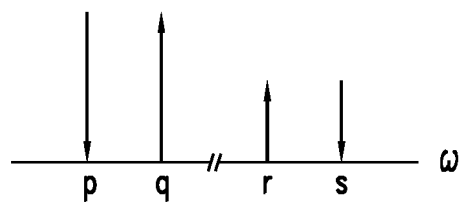
FIGS. 1a and 1b illustrate frequency diagrams of Bragg scattering processes according to some embodiments.
Figure 1B:
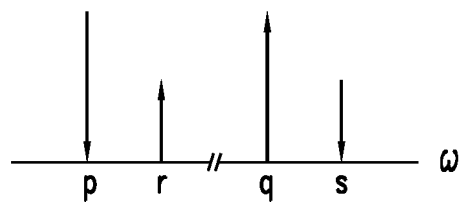

OPPA 200 further comprises a first coupler 203 and a second coupler 204. The first coupler 203 is coupled to the first pump 201 and the second pump 202 on the one hand, and to the second coupler 204 on the other, as shown in FIG. 1. The second coupler 204 is further coupled to an input optical fiber 205 at an input thereof.

The first pump 201 and the second pump 202 are configured to generate respective short pulsed signals. The pulsed pump signal generated by the first pump 201 has a first waveshape, whereas the pulsed pump signal generated by the second pump 202 has a second waveshape. The specific waveshape of each of the pulsed pump signals is chosen so as to maximize interaction with an input optical signal S and to produce the desired shape for an output idler signal I, as will be described din further detail below.

The pulsed pump signals output form the first pump 201 and the second pump 202 are input into the first coupler 203. The coupler 203 combines the two pulsed pump signals and inputs the combined pulsed signals into the second coupler 204.

Assuming that an input optical signal S propagating through the optical fiber 205 is also input into the second coupler 204 as shown in FIG. 2, the second coupler 204 further combines the combined pulsed pump signals received from the first coupler 203 with the input optical signal S.

In an alternative embodiment, a three-way coupler may be used to combine the optical communication signal with the two pump waves.

The combination of the input optical signal S and the pulsed pump signals (herein referred to as combined optical signal) is then output from the second coupler 204 and input into a nonlinear optical material 206. The nonlinear optical material 206 is characterized by a nonlinearity coefficient and a set of dispersion coefficients. These characteristics give rise to a frequency conversion based on parametric processing of the combined optical signal propagating inside the nonlinear optical material by Bragg scattering (nondegenerate FWM).

As a consequence, a sideband signal photon and a pump photon are destroyed and a different sideband signal photon (herein referred to as idler signal) and a pump photon are created. The nonlinear optical material may be of any known material. Some examples may be centrosymmetric media having third-order nonlinearities, for example optical fibers made of silica, bismuth and chalcogenide; other examples may be silicon waveguides (with third-order nonlinearities) and lithium-niobate waveguides (with effective third-order nonlinearities from cascaded second-order nonlinearities).

Assuming that one of the pump signals is configured to co-propagate with the input optical signal S and the other one of the pump signals is configured to co-propagate with the idler signal, the idler signal may be generated such that it has an amplitude profile proportional to the amplitude of the input optical signal and a shape corresponding to the second pump waveshape.

The above configuration of the OPPA 200 allows, on the one hand, for providing an amplitude for the output idler which is proportional to that of the input signal, and on the other, determine the shape-function of the output idler as such shape may correspond to the shape-function of the co-propagating pump. In fact, determining the shape-function of the co-propagating pump provides the further advantage of ability to reshape the output idler arbitrarily, according to any desired shape. This is explained in the following description.

Supposing that the pump and sideband frequencies are chosen so that the conditions for frequency-matching and wavenumber-matching, as mentioned above, are satisfied. Then the sideband evolution is known to be governed by the so-called coupled-mode equations:

$$(\partial_z + \beta_r \partial_t) A_r(t,z) = i \gamma_{pq}(t,z) A_s(t,z), \qquad (1)$$

$$(\partial_z + \beta_s \partial_t) A_s(t,z) = i \gamma_{pq}^*(t,z) A_r(t,z), \qquad (2)$$

where $A_j$ is a slowly-varying wave (mode) amplitude, p and q represent first and second pumps, z denotes distance, t denotes time, s relates to signal sideband, r relates to idler sideband, $\partial$ denotes derivative such that $\partial_t = \partial/\partial t$ is a time derivate and $\partial_z = \partial/\partial z$ is a distance derivative and $\beta_j$ is an abbreviation for the group slowness $\beta_{1j}$, wherein the number 1 denotes the first order, namely the first term in the Taylor expansion of the dispersion function.

The coupling strength is represented by $\gamma_{pq}$ such that $\gamma_{pq} = 2\gamma A_p A^*_q$ where $\gamma$ is the Kerr nonlinearity coefficient, and $A_p$ and $A_q$ are pump amplitudes (wherein $i = \sqrt{(-1)}$ and * is a complex conjugate). The effects of intra-pulse dispersion and pump-induced cross-phase modulation have been neglected, because these effect are typically weak for a wide range of relevant system parameters. Equations (1) and (2) apply to scalar FWM, which involves waves with the same polarization. Similar equations may apply to vector FWM, which involves waves with different polarizations.

The pumps are not affected by the sidebands, so they convect through the nonlinear optical material, for example through a highly nonlinear fiber, with substantially constant shape. In the low-conversion-efficiency regime, the input signal seeds the growth of a weak idler, whose presence does not affect the signal significantly, so the input optical signal also convects through the fiber with substantially constant shape. Hence, the pump and signal amplitudes can be written in the following form:

$$A_j(t,z) = a_j f_j(t - \beta_j z), \quad (3)$$

where $a_j$ is a complex constant and $f_j$ is a complex shape-function. If a normalization condition is imposed, then the following expression is obtained:

$$\int_{-\infty}^{\infty} |\theta_j(t)|^2 dt = 1, \quad (4)$$

in which case the amplitude $a_j$ is the square root of the pulse energy. The idler equation can be written in the following form:

$$(\partial_z + \beta_r \partial_t) A_r(t,z) = i 2\gamma A_p(t-\beta_s z) A_q^*(t-\beta_r z) A_s(t-\beta_s z) \quad (5)$$

where the terms on the right side are specified functions. Assuming that the retarded time $t - \beta_r z$ is represented by $\tau$, then the idler equation is expressed as follows:

$$\partial_z A_r(\tau, z) = i 2\gamma A_p(\tau + \beta_{rs} z) A_s(\tau + \beta_{rs} z) A_q^*(\tau) \quad (6)$$

Where $\beta_{rs} = \beta_r - \beta_s > 0$ is the differential slowness (walk-off). By integrating Eq. (6), in which $\tau$ is a parameter, one finds the following expression for the output idler:

$$A_r(\tau, l) = i 2\gamma \int_0^l A_p(\tau - \beta_{rs} z) A_s(\tau - \beta_{rs} z) dz A_q^*(\tau). \quad (7)$$

Equations (3) and (7) imply that the amplitude of the output idler $A_r$ is proportional to the amplitude of the input signal $A_s$, so information is transferred from the input optical signal to the idler. The shape of the output idler depends on the shapes of the input pumps signals. If the input durations are significantly shorter than the walk-off time $\beta_{rs} l$, then the waves may collide entirely within the fiber. In fact, the requirement that the collision be complete imposes a minimal-length requirement on the fiber. In such case, the integral in Eq. (7) does not depend on $\tau$ and the shape-function of the output idler is the conjugate of the shape-function of pump q (which co-propagates with the idler). The interaction between the input optical signal and pump p co-propagating with the input optical signal (namely, the efficiency with which they drive FWM, i.e. idler generation) is strongest if their shape-functions are conjugates of each other, in which case the following expression applies:

$$A_r(t,l) = i(2\gamma a_p a_q^*/\beta_{rs}) a_s \int_q^* (t - \beta_r l, 0). \quad (8)$$

Equation (8) shows that the conversion efficiency is proportional to the nonlinearity coefficient and the product of the pump amplitudes, and is inversely proportional to the walk-off (If $\beta_p$ differs slightly from $\beta_s$, the conversion efficiency is reduced slightly.)

As stated above, the amplitude of the output idler is proportional to that of the input signal. Furthermore, the shape-function of the output idler is specified by the shape-function of the co-propagating pump (not the input optical signal). This pump shape-function could be the same as, or different from, the input optical signal shape-function. Hence, the output idler can be reshaped arbitrarily relative to the input signal. In particular, the amplitude fluctuations associated with a noisy signal can be removed. Similar results apply to the generation of an output signal by pumps and an input idler.

In the following, three examples of idler generation and signal reshaping are considered. Time is measured in units of the common pump duration (root-mean-squared width) $\sigma$, amplitude is dimensionless and distance is measured in units of $\sigma/\beta_r$. For these conventions, group slowness is measured in units of $\beta_r$, and the interaction length $\beta_r l/\sigma$ is the ratio of the idler transit time to the pump duration. The pumps and signal have Gaussian or rectangular shape-functions. All of the following results were obtained by integrating Eq. (7) numerically, for the case in which $\beta_s/\beta_r = -1$. This relation is valid in a frame moving with the average group speed of the sidebands. Consistent with Eq. (8), the idler amplitude is measured in units of $i 2\gamma a_p a_q^*/\beta_r$.

In the first example, all three input pulses (both pumps and the input optical signal) are Gaussian, and are timed to collide (overlap completely) substantially in the middle of the fiber. The idler generated by these inputs is illustrated in FIG. 3.

Figure 3:
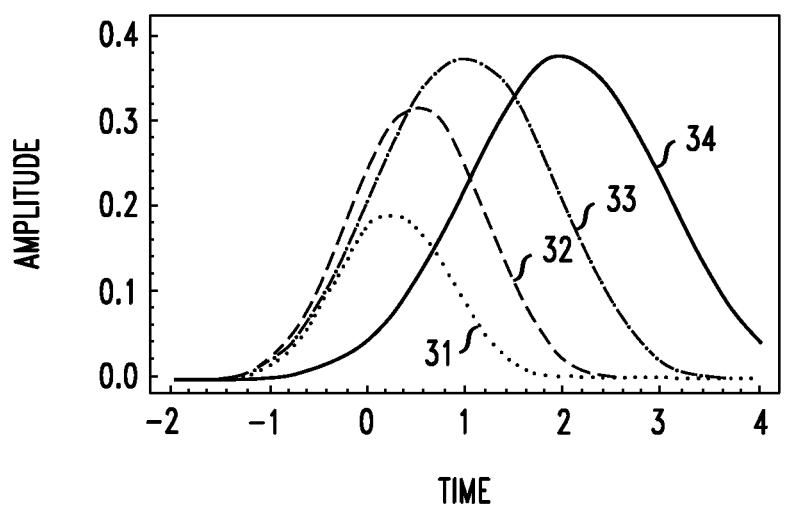
FIG. 3 is an exemplary graphical representation of amplitude profiles of an idler signal generated, under hypothetical noise-less conditions, by the apparatus of FIG. 2.

In FIG. 3 different amplitude profiles are shown as a function of time each curve relating to a different interaction length. Curve 31 represents an interaction length of 0.5, curve 32 represents an interaction length of 1.0, curve 33 represents and interaction of 2.0 and curve 34 represents as interaction of 4.0. As seen in FIG. 3, as the interaction length increases, so also does the idler amplitude and time delay. However, increasing the length beyond a value of about 2, delays the idler, but does not change significantly its peak amplitude or shape. The peak amplitude of the output idler is lower than that of its co-propagating pump by a factor of $\beta_{rs}/\beta_r = 2$.

In the previous example, the input signal was assumed to be a perfect noiseless Gaussian. However, real signals are usually degraded by noise.

Figure 4A:
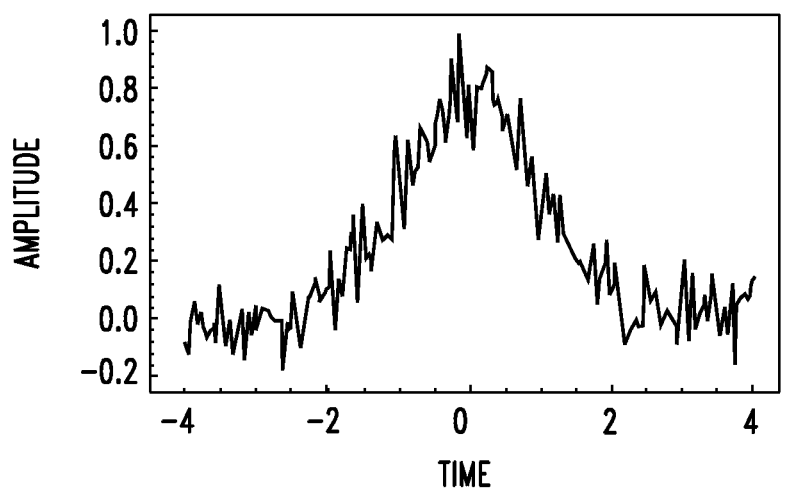
FIG. 4a through 4e are exemplary graphical representations of amplitude profiles, under noisy conditions, of an optical signal (FIG. 4a) and amplitude profiles of an idler signal (FIG. 4b through 4e) generated by the apparatus according to the present disclosure.
Figure 4B:
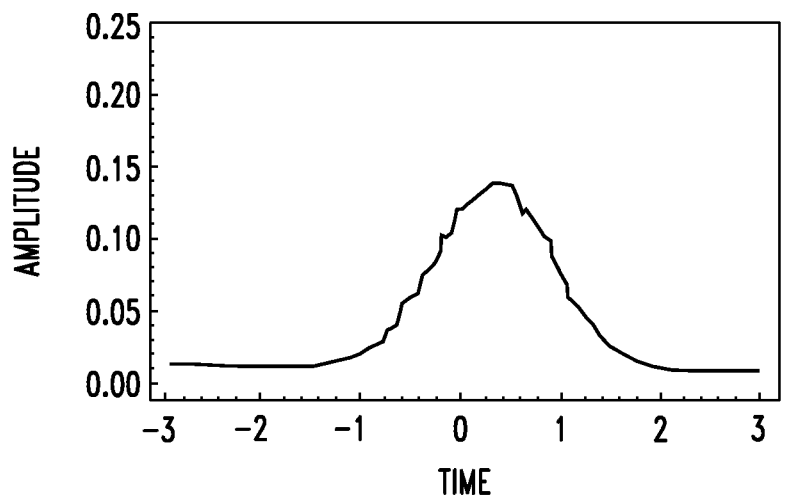
Figure 4C:
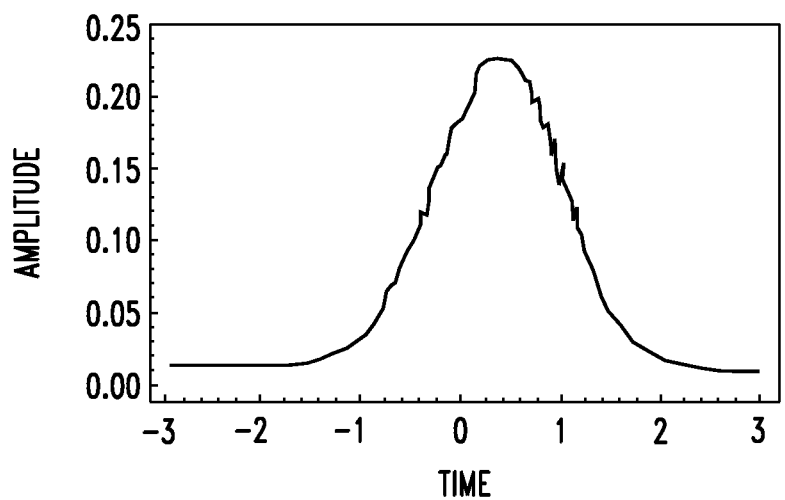
Figure 4D:
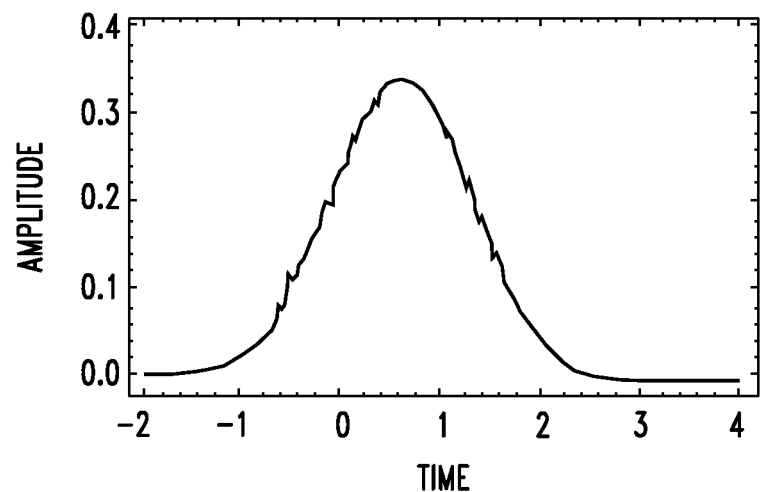
Figure 4E:
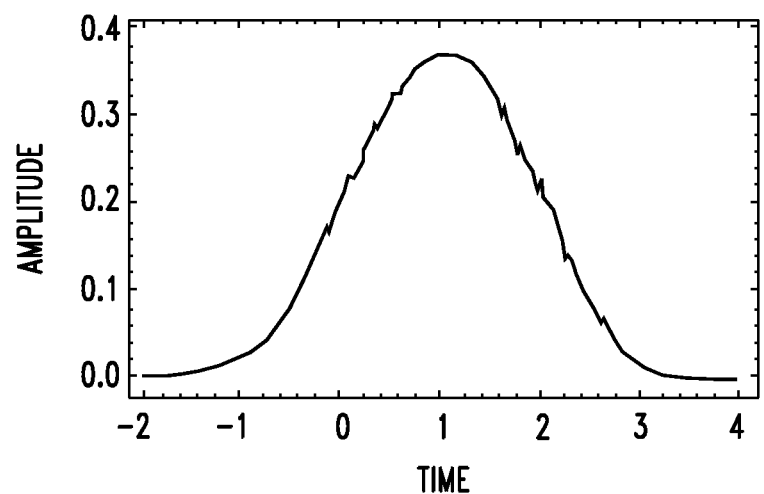

The second example therefore relates to noisy conditions. FIG. 4a shows an amplitude profile of a noisy signal as a function of time. In this example it is assumed that the pumps are noiseless Gaussian waves. Various idler amplitude profiles generated by such inputs are illustrated in FIGS. 4b through 4e. FIG. 4b represents an amplitude profile related to an interaction length of 0.25, FIG. 4c represents an amplitude profile related to an interaction length of 0.50, FIG. 4d represents an amplitude profile related to an interaction length of 1.00 and FIG. 4e represents an amplitude profile related to an interaction length of 2.00.

The amplitude of the output idler at time t depends on the amplitude of the input signal at time t', where $t - \beta_r l \le t' \le t - \beta_s l$. As the interaction length increases, so also does the number of input signal values on which the output idler value depends (input signal values are meant to refer to signal amplitudes at different instants of time).

Since these input values are statistically independent, the variance of their sum increases (at most) linearly with distance, so the deviation of their sum increases as the square root of distance. Hence, the idler fluctuations increase less rapidly than the mean amplitude, so the idler profile is smoothed.

It should be emphasized that pulsed frequency conversion regenerates the pulse shape, but does not regenerate the pulse peak-amplitude. This process is complementary to gain-saturated amplification, which removes peak-amplitude variations from a sequence of pulses, but distorts the pulse shapes, therefore a choice may be made as to which process is preferred for use according to the specific application on a case by case basis. Furthermore the two processes may be used in combination if required.

Figure 5:
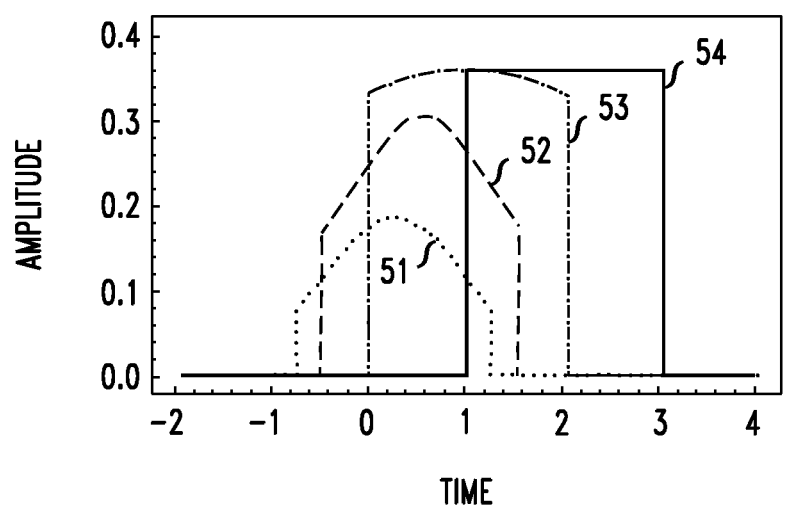
FIG. 5 is an exemplary graphical representation of amplitude profiles of an idler signal generated by the apparatus according to the present disclosure.

In the third example, the input optical signal and its co-propagating pump are Gaussian, whereas the other pump is rectangular. The idler generated by these inputs is illustrated in FIG. 5. Curve 51 represents an idler amplitude profile with interaction length of 0.5, curve 52 represents an idler amplitude profile with interaction length of 1.0, curve 53 represents an idler amplitude profile with interaction length of 2.0 and curve 54 represents an idler amplitude profile with interaction length of 4.0.

The output idler has substantially the same shape as the pump q. As the shape of the second pump q may be chosen arbitrarily, an arbitrary reshaping process therefore becomes possible.

As shown in FIG. 5, as the interaction length increases, the idler amplitude increases and the idler shape becomes more rectangular. Increasing the length beyond a value of about 3 delays the idler, but does not change its shape. This is due to the fact that if the fiber is long enough for a complete collision, lengthening it further does not change the collision being complete. In fact the pumps and sidebands spend more time propagating without overlapping before and after the collision. The peak amplitude of the output idler is lower than that of its co-propagating (rectangular) pump by a factor of $\beta_{rs}/\beta_r=2$.

By combining the effects demonstrated in the last two examples, one can simultaneously regenerate and reshape a noisy input signal, or a collection of noisy input signals with the same carrier frequency or different carrier frequencies. The fiber should preferably be long enough that each pump-sideband collision is complete, but short enough that the input optical signal (idler) from one collision does not intersect the idler (signal) from the next collision. In this context long may be understood to satisfy the following relations $\beta_r l/\sigma \gg 1$, wherein preferred values may be in the range of $\beta_r l/\sigma > 4$.

For some applications, it is disadvantageous to have the output idler (copied and reshaped signal) at a frequency different from that of the input signal. This problem can be solved by subsequent frequency conversion. In addition to BS, which produces frequency-shifted idlers that are direct copies of signals, use may be made of a degenerate FWM process called modulation interaction (MI) and/or a nondegenerate FWM process called phase conjugation (PC), both of which produce frequency-shifted idlers that are conjugated copies of the input optical signals. One can convert the frequency of the primary idler back to the input optical signal frequency (or any other frequency) by using any of these processes, or a combination thereof. BS driven by continuous-wave (CW) pumps produces a secondary idler that is proportional to $a_s f_q^*(t)$, whereas MI and PC driven by CW pumps produce secondary idlers that are proportional to $a_s^* f_q(t)$. If necessary, subsequent FWM driven by pulsed pumps can reshape the primary idler. Alternatively, one could use prior frequency conversion to produce a (direct or conjugate) copy of the input optical signal, which would be used to drive the BS process described above. In this case, the secondary idler would be proportional to $a_s f_q^*(t)$ [prior BS] or $a_s^* f_q^*(t)$ [prior MI or PC].

Cross-polarization rotation can occur in materials (such as randomly-spun fibers) with tensor Kerr nonlinearities. Consider the evolution of two waves which propagate in the same direction, but have different frequencies (1 and 2), and let X and Y denote their polarization components. Then the nonlinearity that enables cross-polarization rotation couples $X_1$ to $Y_2$ (or $Y_1$ to $X_2$) in the same way that $A_r$ is coupled to $A_s$ in BS. In this process, $X_1$ is the input optical signal and $Y_2$ is the idler (or vice versa), each of which co-propagates with a pump ($X_2$ and $Y_2$) respectively.

Alternatively, consider two waves that have the same frequency, but propagate in opposite directions (1 and 2). Then the cross-polarization rotation nonlinearity still couples $X_1$ to $Y_2$ (or $Y_1$ to $X_2$) in the required manner, and each sideband still co-propagates with a pump. Hence, it is also possible, in principle, to reshape pulses by using cross-polarization rotation instead of FWM.

In fact, vector FWM and cross-polarization rotation stem from substantially the same tensor nonlinearity. If the interacting waves all have the same frequency, the resulting phenomenon is typically called cross-polarization rotation, whereas if they have different frequencies it is typically called FWM. One may consider that cross-polarization rotation is enabled by substantially the same nonlinearity that enables FWM, and has properties that are substantially similar to those of FWM. To be precise, the different polarization components in cross-polarization rotation exchange energy in substantially the same way as the different frequency components in FWM.

Although the theory of frequency conversion and reshaping was described for classical waves, similar results apply to pulses (wavepackets) containing arbitrary numbers of photons (including single photons). In the standard formulation of frequency conversion, the pumps are strong, so can be modeled classically, whereas the sidebands are very weak, so must be modeled quantum-mechanically. The Heisenberg equations for the sideband wavepackets are Eqs. (1) and (2), with the sideband amplitudes Ar and As replaced by the quantum mode operators $\hat{a}_r$ and $\hat{a}_s$. Hence, the input signal and output idler operators are also related by Eqs. (7) and (8), so the quantum properties of photons are transferred from the input optical signal to the idler in essentially the same way as the classical properties of pulses. In particular, the photon wavepackets can be reshaped arbitrarily.

Finally, nonlinear optical materials may be highly nonlinear optical fibers that have direct third-order nonlinearities as well as other materials such as periodically-poled lithium niobate that have effective third-order nonlinearities produced by cascaded second-order nonlinearities. It is also possible to reshape optical signals in these materials.

In this manner, optical signal pulses may be reshaped advantageously by removing excess noise and other distortions and changing their information format (waveshape) which in turn allow for optimizing transmission through the next stage of a link or for other applications.

The solution provided herein may be implemented in relation to signal pulses in conventional communication systems as well as single-photon wavepackets in quantum information experiments. Furthermore, multiple input signals with different carrier frequencies can be processed simultaneously.

The various embodiments of the present invention may be combined as long as such combination is compatible and/or complimentary.

Further it is to be noted that the list of structures corresponding to the claimed means is not exhaustive and that one skilled in the art understands that equivalent structures can be substituted for the recited structure without departing from the scope of the invention.

It is also to be noted that the order of the steps of the method of the invention as described and recited in the corresponding claims is not limited to the order as presented and described and may vary without departing from the scope of the invention.

What is claimed is:

1. A method of processing an optical signal comprising:
combining, by means of Bragg scattering, an input optical signal having a peak amplitude and a carrier frequency with a first pulsed pump signal having a first waveshape and a second pulsed pump signal having a second waveshape, thereby generating a combined optical signal;
inputting the combined optical signal in a nonlinear optical material for causing said input optical signal, said first pulsed pump signal and said second pulsed pump signal to interact with each other so as to generate an idler signal, said idler signal having a carrier frequency which is different from the carrier frequency of the input optical signal; and
wherein the first pulsed pump signal co-propagates with the input optical signal and the second pulsed pump signal co-propagates with the idler signal, and wherein the idler signal has a peak amplitude proportional to the peak amplitude of the input optical signal and a shape corresponding to the second pump waveshape.

2. The method of claim 1 wherein the first pump waveshape is chosen so as to maximize interaction of said pulsed pump signal with the input optical signal thereby producing a shape for an output idler signal corresponding to the second pump waveshape.

3. The method of claim 1 or claim 2 further comprising an FWM process thereby producing a frequency-shifted idler being a conjugated copy of the input optical signals thereby converting a frequency of the idler to a frequency of the input optical signal.

4. The method of claim 1 or claim 2 wherein frequency conversion is applied to the input optical signal prior to inputting the combined optical signal into a nonlinear optical material.

5. The method of claim 1, wherein the method of frequency conversion and reshaping is applied to pulses containing arbitrary numbers of photons.

6. An apparatus for processing an optical signal comprising:
a coupler, a first pump and a second pump wherein the coupler is configured for combining, an input optical signal having a peak amplitude and a carrier frequency with a first pulsed pump signal generated by the first pump and having a first waveshape and a second pulsed pump signal generated by the second pump and having a second waveshape, thereby generating a combined optical signal;
a nonlinear optical material capable of receiving the combined optical signal and causing said input optical signal, said first pulsed pump signal and said second pulsed pump signal to interact with each other by means of Bragg scattering so as to generate an idler signal, said idler signal having a carrier frequency which is different from the carrier frequency of the input optical signal; and
wherein, in use, the first pulsed pump signal co-propagates with the input optical signal and the second pulsed pump signal co-propagates with the idler signal, the idler signal having a peak amplitude proportional to the peak amplitude of the input optical signal and a shape corresponding to the second pump waveshape.

7. The apparatus of claim 6, wherein the coupler comprises a first coupler for combining the first pulsed pump signal with the second pulsed pump signal thereby generating a combined pulsed pump signal and a second coupler for combining the combined pulsed pump signal with the input optical signal.

8. The apparatus of claim 6, wherein the coupler is a three-way coupler adapted for combining the first pulsed pump signal, the second pulsed pump signal and the input optical signal.

* * * * *